United States Patent Office 3,473,893
Patented Oct. 21, 1969

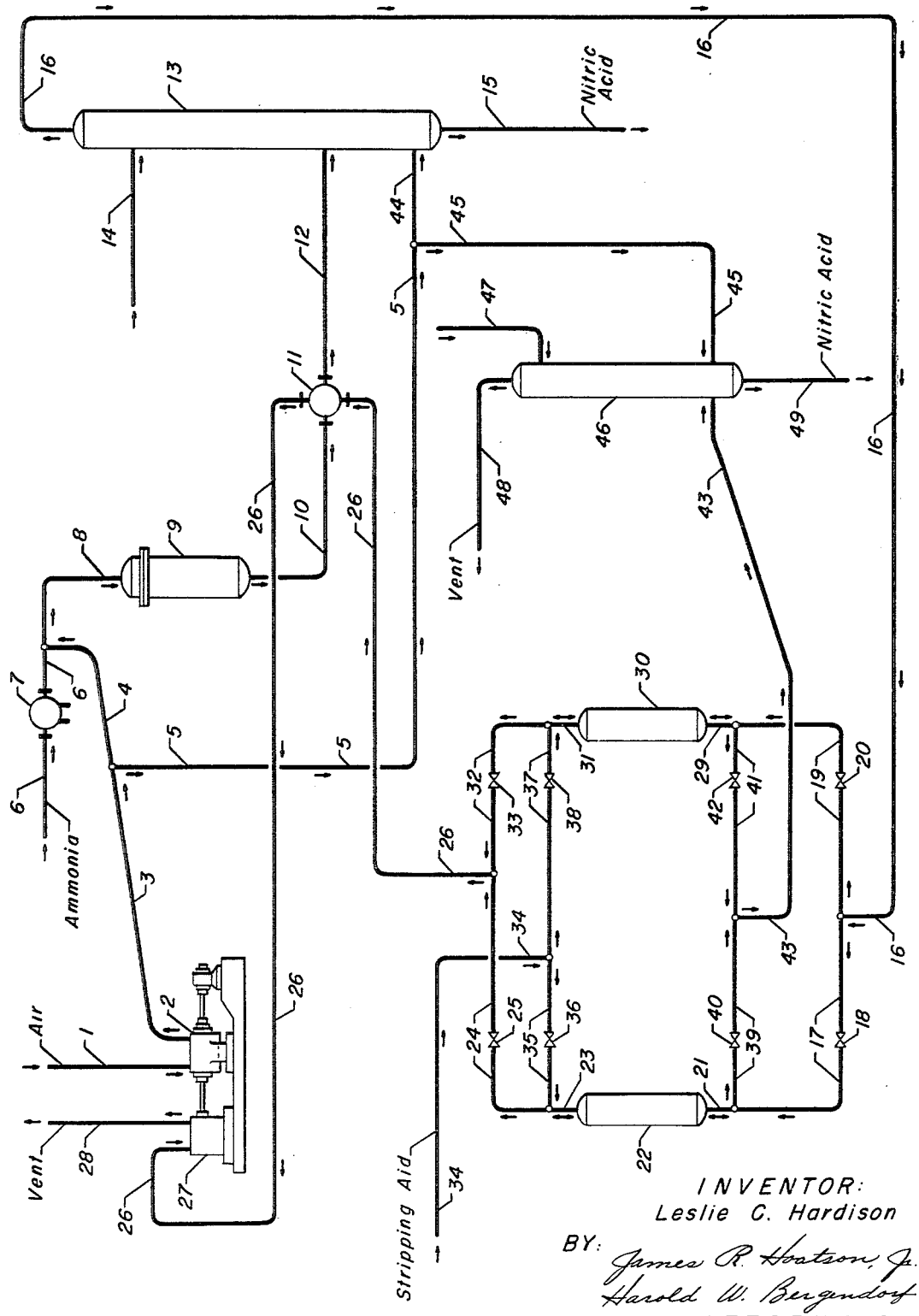

3,473,893
PROCESS FOR PRODUCING NITRIC ACID
Leslie C. Hardison, Norwalk, Conn., assignor to Universal Oil Products Company, Des Plaines, Ill., a corporation of Delaware
Filed Apr. 27, 1967, Ser. No. 634,155
Int. Cl. C01b 21/40
U.S. Cl. 23—162                                7 Claims

ABSTRACT OF THE DISCLOSURE

Combination process for the enhanced production of nitric acid wherein ammonia is oxidized to produce a gaseous stream containing nitrogen oxides, most of the nitrogen oxides are absorbed with water in a countercurrent water scrubber, called a first absorption zone, the remaining gaseous effluent from the first absorption zone containing a significant amount of nitrogen oxides is contacted with a swing bed adsorption system using a mordenite adsorbent to remove most of the remaining nitrogen oxides and the adsorbed nitrogen oxides are recovered and introduced into a separate second absorption zone maintained at lower pressure than the first absorption zone.

---

This invention relates to the production and enhanced recovery of nitric acid via the ammonia oxidation route. More specifically, this invention relates to a process for producing nitric acid wherein the nitrogen oxides formed by the oxidation of ammonia are subjected to three recovery systems, the first system being a first absorption zone, the second being an adsorption system, and the third system being a second absorption system. The adsorption system comprises a swing bed adsorbent wherein the bed being regenerated to remove previously adsorbed nitrogen oxides utilizes a stripping aid and lower pressures than that employed on a previous adsorption cycle to recover the nitrogen oxides and nitric acid therefore. This regeneration effluent is introduced into a second water scrubber absorber maintained at lower pressure than the first absorber to separately recover nitric acid from this regeneration effluent gas. Still more specifically, this invention relates to a combination process to produce nitric acid wherein an adsorbent is employed to remove a substantial part of nitrogen oxides in the effluent from a first absorption zone and the adsorbed nitrogen oxides are desorbed from the adsorbent in a separate regeneration step and thereafter introduced into a separate second low pressure absorption system.

In one of its embodiments, this invention relates to a combination process for the enhanced production of nitric acid which comprises: (a) oxidizing ammonia in a catalytic reaction zone at elevated pressure and temperature; (b) withdrawing a gaseous reactor effluent comprising nitrogen oxides from said reactor and introducing said gaseous reactor effluent into a lower part of a first absorption zone; (c) introducing a liquid comprising water into an upper part of the first absorption zone and absorbing and reacting nitrogen oxides therewith to form nitric acid therefrom; (d) withdrawing a gaseous stream containing a significant amount of unabsorbed oxides from an upper portion of the first absorption zone; (e) contacting said gaseous stream with an adsorbent in a first adsorption bed at elevated pressures to adsorb nitrogen oxides therefrom for a first period of time; (f) regenerating the adsorbent contained within said first adsorption bed for a second period of time by lowering the pressure in the first adsorbent bed and passing stripping aid therethrough; (g) recovering a regeneration effluent from the first adsorption bed during the second period of time comprising stripping aid and components desorbed off the adsorbent; (h) introducing the regeneration effluent into a lower part of a second absorption zone; (i) introducing a liquid comprising water into an upper part of the second absorption zone and absorbing and reacting nitrogen oxides therewith to form nitric acid therefrom; and (j) recovering nitric acid from the first and second adsorption zones.

The present day nitric acid plants for producing nitric acid are almost exclusively accomplished by the reaction of ammonia with air or oxygen. There are three basic reactions which appear in this commercial nitric acid process. In the first step, liquefied ammonia is vaporized and preheated before being mixed with preheated air. The resulting mixture is usually introduced into a reaction zone at a temperature at about 300° C. and usually contains from about 10 to about 13 volume percent ammonia. The reaction zone contains a pad of platinum alloy gauze. The ammonia and air pass downward through the reaction zone which results in the formation of nitric oxide as a highly exothermic reaction at the platinum alloy surface. This step may be chemically summarized by the following reaction equation:

$$4NH_3 + 5O_2 \rightarrow 4NO + 6H_2O$$

The second reaction that occurs is the oxidation of nitric oxide to produce nitrogen dioxide (or dinitrogen tetraoxide) in accordance with the following simplified reaction equation:

$$2NO + O_2 \rightarrow N_2O_4$$

The nitric oxide is reacted by means of secondary air and reacts homogeneously in the gaseous phase. The third major reaction involves the absorption of dinitrogen tetraoxide in water to produce nitric acid in accordance with the following simplified reaction equation:

$$3N_2O_4 + 2H_2O \rightarrow 4HNO_3 + 2NO$$

The NO is recycled for further oxidation. In a modern plant, the heat liberated by the ammonia oxidation reaction is usually recovered enabling the plant to be self-supporting for its power requirements once the reaction has reached optimum conditions. The first two basic reactions described hereinabove occur primarily in the catalytic reaction zone while the third reaction occurs primarily in the first absorption zone. Due to equilibrium and temperature requirements not all the nitric oxides are removed in the absorption zone. Frequently, gaseous effluents from the absorption zone contain as much as 5000 p.p.m. $NO_x$, more or less depending upon the conditions employed in the absorption zone. Heretofore, this gas has been discharged to the atmosphere, representing a loss in yield of nitric acid product and also presenting an air pollution problem. It is estimated that in a typical nitric acid plant, about 4% of the product is lost through the stack as $NO_x$. With increasing emphasis on air pollution control, steps have been taken in the recent past to treat this effluent gas to make it less of an air pollution problem. Presently, methane or other reducing gas is injected and mixed with this effluent gas and the resulting mixture is passed over a catalyst to effect partial reduction of the $NO_2$ to produce nitrogen and NO. This tends to eliminate any brown plume leaving the plant but does not satisfactorily solve the air pollution problem. The present process provides an economical system to substantially remove the nitrogen oxides of the gaseous effluent from the first absorption zone and also to recover the nitrogen oxides which can subsequently be used in the manufacture of additional nitric acid thereby enhancing the recovery of nitric acid from the overall process. It is preferred to treat the effluent gas with a fixed bed of solid adsorbent to adsorb water and nitric acid and nitrogen oxides from the effluent gas. Recovery of these adsorbed components to produce additional valuable product helps to pay for the cost of this extra treating adsorption step. The adsorbed components are removed in a separate regeneration step wherein the bed is maintained at lower pressures than the adsorption conditions and a stripping aid is passed therethrough to help remove the adsorbed components from the adsorbent. Since the regeneration effluent is recovered from the adsorbent bed at low pressures, in order to return this gas through the first absorption zone, it would be necessary to install a corrosion resistant compressor. The cost of such a compressor is considered to be prohibitive. However, this regeneration gas effluent may be recovered satisfactorily by passing the regeneration gas into a separate low pressure absorption zone and contacting the regeneration gas with water therein. Generally, nitric acid plants run at pressures of from about 50 to about 150 p.s.i.g. and the absorption conditions are maintained substantially at that pressure. It becomes possible to depressure the adsorbent bed on the regeneration cycle down to about atmospheric pressure and pass stripping aid therethrough and recover the regeneration effluent in an atmospheric pressure water scrubber. The nitric acid recovered from the second low pressure absorption system may be commingled with the nitric acid produced from the first absorption system to produce enhanced quantities of nitric acid. The process of the present invention provides for the inexpensive and efficient recovery of the nitric acid and nitrogen oxides from the adsorbent bed.

It is an object of this invention to eliminate air pollution problems from the nitric acid plants.

It is another object of this invention to enhance the recovery of nitric acid from a nitric acid process involving the oxidation of ammonia.

It is a more specific object to efficiently and economically recover nitric acid and nitrogen oxides from gaseous effluents in nitric acid plants.

It is a more specific object to provide economical means to regenerate an adsorbent used to recover nitrogen oxides from the gaseous effluent in a nitric acid plant.

These and other objects will become more apparent in the light of the following detailed description.

The accompanying drawing shows an overall flow scheme for the combination process of the present invention.

Referring to the accompanying drawing, air is introduced through conduit 1 which flows through main compressor 2 and through conduits 3 and 4. Liquefied ammonia is introduced through conduit 6 where it passes through vaporizer 7 and mixes with the air and the resulting mixture passes through conduit 8 and into reaction zone 9. Reaction zone 9 contains a noble metal gauze such as platinum, rhodium or alloy mixtures thereof to promote the oxidation of ammonia. Reactor effluent is withdrawn from reaction zone 9 through conduit 10 where it flows through heat exchanger 11, conduit 12 and into first absorption zone 13. Secondary air flows from conduit 3 through conduits 5 and 44 and into first absorption zone 13 to promote further oxidation of nitric oxide to produce nitrogen dioxide which in turn produces nitric acid. Water is introduced through conduit 14 and into absorption zone 13 where it counter currently contacts the ascending nitrogen oxides and air to produce nitric acid. Nitric acid is withdrawn from the bottom of absorption zone 13 through conduit 15. An unadsorbed gas stream is withdrawn from absorption zone 13 through conduit 16 where it flows into a swing bed adsorption system. The adsorption system comprises at least two fixed beds of solid adsorbent operated on a swing bed cycle wherein one bed is on an adsorption cycle and one bed is being regenerated (on a regeneration cycle). For purposes of illustration, bed 22 will be assumed to be on an adsorption cycle and bed 30 will be assumed to be on a regeneration cycle. The gaseous effluent from absorption zone 13 flows through conduit 16, conduit 17, valve 18, conduit 21 and into one end of absorption zone 22 maintained at about nitric acid plant pressure. The gaseous effluent is withdrawn from the other end of bed 22 through conduit 23 where it flows through conduit 24, valve 25, conduit 26 through heat exchanger 11 through expander 27 and out to vent through conduit 28. Although any convenient source of stripping aid may be employed, air is quite satisfactory and is readily available from the compression section of the process. In some instances, it may be preferable to utilize a separate low pressure blower to supply stripping aid to the adsorbent bed being regenerated. When utilizing air from the compression section of the nitric acid plant, a portion of the secondary air flowing in conduit 5 is diverted to conduit 34, and thereafter flows into conduit 37, valve 38, conduit 31 into the other end of and downflow through bed 30. When utilizing a separate low pressure blower, the discharge of the blower is introduced into conduit 34 and then flows as described hereinabove. Bed 30 is maintained at low pressures preferably slightly super atmospheric to provide enough driving force to drive the regeneration effluent into second absorption zone 46. The regeneration effluent comprising stripping aid and desorbed nitrogen oxide and nitric acid leaves the one end of bed 30 and flows through conduit 29, conduit 41, valve 42, conduit 43 and into absorption zone 46. Liquid water is introduced into the upper portion of absorption zone 46 through conduit 47 where it countercurrently contacts the ascending gaseous regeneration effluent stream to produce nitric acid therein. Nitric acid is withdrawn from a lower portion of adsorption zone 46 through conduit 49. Unadsorbed gases are withdrawn from absorption zone 46 through conduit 48 and out to vent. It is expected that with proper manipulation of the process variables, the concentration of nitrogen oxides in this gaseous stream, will be well below about 100 p.p.m. If desired, additional secondary air may be introduced into a lower portion of absorption zone 46 as is done in absorption zone 13. This may readily be accomplished by flowing a portion of the secondary air in conduit 5 into conduit 45 and then into absorption zone 46. Alternately, if a separate low pressure blower is utilized, a portion of the discharge thereof is introduced into a lower portion of absorption zone 46. This operation is continued until bed 30 has been regenerated. At some point shortly thereafter, the beds are switched such that bed 22 is placed on a regeneration cycle and bed 30 is placed on an adsorption cycle. This is accomplished by opening valves 20, 33, 36 and 40 and closing valves 18, 25, 38 and 42. The flow now proceeds as follows: the gaseous effluent from absorption zone 13 flows through conduit 16, conduit 19, valve 20, conduit 29 into the one end of and upflow through bed 30. The nitrogen oxides and water are adsorbed in bed 30 and the unadsorbed effluent is removed therefrom through conduit 31, conduit 32, valve 33, out conduit 26 flowing thereafter as described hereinabove. Stripping aid flows from conduit 34 to conduit 35, valve 36, conduit 23 and into the other end of and downflow through bed 22 to sweep the desorbed nitrogen oxides and nitric acid out of bed 22. Bed 22 is now maintained at slightly superatmospheric pressure as described hereinbefore. The regeneration effluent from bed 22 is withdrawn from the one end thereof and through conduit 21, conduit 39, valve 40, conduit 43 and into adsorption zone 46 as previously described. Thus, in the overall picture, the gaseous effluent from absorption zone 13 is continually introduced one of the two adsorbent beds and an unadsorbed gaseous effluent is continuously withdrawn from the bed on the adsorption cycle. Stripping aid is continually introduced into the bed being regenerated and a regeneration effluent comprising stripping aid, depressured gas, desorbed nitrogen oxides, and nitric acid is continuously removed from the bed on the regeneration cycle and continually introduced into second absorption zone 46. The nitric acid recovered from conduit 15 and conduit 49 may be commingled. Since this adsorption system operates on a pressure swing cycle, it is the pressure differential between the adsorption cycle and the regeneration cycle which provides the mechanism whereby the system is operative.

A preferable adsorption to be utilized in beds 22 and 30 comprises synthetic mordenite, a crystalline aluminosilicate capable of withstanding repeated exposures to nitric acid. Mordenite is especially suited to withstand contact with nitric acid even under the operating conditions of high and low pressure. Mordenite, besides being effective in adsorbing water and nitrogen oxides from the gaseous effluent flowing in conduit 16, is also effective in promoting the oxidation of nitric oxide to nitrogen dioxide (or dinitrogen tetraoxide). Suitable adsorption conditions maintained during the adsorption cycle are pressures of from about 50 to about 120 p.s.i.g., temperatures of from about 70 to about 150° F. (temperatures may exceed this amount due to heat of adsorption). Suitable regeneration conditions comprise pressures of from about atmospheric pressure to about 10 p.s.i.g. although even lower pressures such as vacuum may be employed. This may readily be accomplished by pulling a vacuum in conduit 48. It is preferred to use slightly superatmospheric pressures, however, in order to minimize the recovery cost. Suitable times between swinging beds are from about a few minutes to several days although preferably about an hour is employed.

The primary variable to effect full regeneration of the absorbent bed on the regeneration cycle is the amount of stripping aid passed through the absorbent bed during the regeneration cycle. It should be recognized that when the bed to be regenerated is depressured down to regeneration pressure, the pressure is relieved by bleeding off gas through said one end of the bed so the contained interstitial gas sweeps through the bed as the pressure drops therein. This sweeping action during depressuring aids in the regeneration of the bed and thus the relieving of pressure on this trapped gas acts as a stripping aid. Therefore, when utilizing the term stripping aid, it is intended to include the trapped gas contained within the bed when the regeneration cycle starts. If sufficiently large pressure differentials are employed between the adsorption and regeneration zones, it may be possible to eliminate any outside extraneous stripping aid. However, it is preferred to utilize at least a small portion of outside stripping aid. The minimum required stripping aid is a function of the pressure differential between the adsorption cycle and the regeneration cycle and the temperature during the regeneration cycle (or the temperature of the stripping aid since the bed will be cooled by desorption of the adsorbed components and the cooler the temperature of the bed, the more difficult it is to desorb the adsorbed components thereof). Since the air to the reactor is usually preheated (not shown in drawing), a portion of the preheated air may be utilized as stripping aid to help maintain the temperature of the bed during at least part of the regeneration cycle. If the average temperature during the regeneration cycle is about the same as the adsorption cycle then the pressure differential will set the minimum required stripping aid. It is preferred to pass at least an equal amount of flowing gas at actual conditions of temperature and pressure through the bed on the regeneration cycle as was passed through the bed on the adsorption cycle. Thus, if temperature is constant, an adsorption cycle pressure of 85 p.s.i.g. (100 p.s.i.a.) and a regeneration cycle pressure at atmospheric (15 p.s.i.a.) will require a stripping aid rate of 15% of the feed gas rate to pass the same flowing cubic feet of gas through the bed on both the regeneration and adsorption cycles. It is preferred to use an excess of from about 10% to about 100% of the minimum required amount of stripping aid in addition to the minimum, however, in order to insure complete regeneration, or stated another way, the flowing volume of stripping aid including the volume of depressured gas calculated at regeneration pressures is preferably from about 110% to about 200% of the flowing volume of gaseous feed to the adsorption zone. Too much stripping aid should not be employed, however, since the desorbed components will become diluted and thus more difficult to absorb in the second absorption zone as well as making it more difficult to reoxidize nitric oxide. For example, using an adsorption pressure of 85 p.s.i.g., and an atmospheric pressure regeneration, the minimum required amount of stripping aid is 15% of the feed gas rate and the preferred amount of stripping aid is from about 16.5 to about 30% of the feed rate. This is calculated as follows:

Minimum stripping aid volume=

$$\text{feed gas volume} \left( \frac{\text{absolute regeneration pressure} \times 100}{\text{absolute adsorption pressure}} \right)$$

Minimum stripping aid volume=

$$(FGN)(100)\left(\frac{15}{100}\right) = 15\% \text{ of feed gas volume}$$

Preferred lower amount = (10%) of 15% + 15% = 16.5%

Preferred upper range = 100% of 15% + 15% = 30%

Likewise, for any other adsorption pressure, a corresponding preferable amount of stripping aid is readily calculated. Since a portion of the stripping aid is supplied by the depressuring operation, it will not be necessary to entirely use outside stripping aid. Thus, depending on the pressure differential outside stripping rates of from 0 to about 5% of the total flow of feed gas are preferably employed, the remaining stripping aid being derived from depressuring as described hereinbefore. It is also preferable to wait until the bed on the regeneration cycle is fully depressured before cutting the outside stripping aid therein. Air is a preferable outside stripping aid.

Suitable conditions maintained in reaction zone 9 comprise pressures of about atmospheric to about 10 atmospheres, temperatures of from about 800 to about 950° C. with an ammonia concentration in the feed to the reaction zone of about 10 to about 13 volume percent.

First absorption zone 13 preferably contains cooling means in several stages within the overall first absorption system to keep the temperatures within the first absorption zone down to reasonable temperatures wherein the nitrogen oxides may be satisfactorily absorbed. It is expected that the concentration of nitric acid leaving conduit 15 will be from about 30 to about 70% $HNO_3$. Absorption zone 13 is maintained at pressures of from about 1 atmosphere to about 10 atmospheres and preferably at the same pressure as the reaction zone (except for pressure drop through the lines) when pressures in excess of about 4 atmospheres are employed. In this manner, it will not be necessary to compress the reactor effluent and at the same time permit the efficient recovery of nitrogen oxides using water in the absorption zone 13. In general, absorption zone 13 is maintained at pressures in excess of about 50 p.s.i.g. so as to produce a minimum pressure differential between adsorption and regeneration conditions of 50 p.s.i.

One of the significant features of the present invention allows the economical recovery of regenerated adsorbed nitrogen oxides, water and nitric acid by depressuring the adsorbent bed on the regeneration cycle from reactor pressure down to essentially atmospheric pressure and using a second separate low pressure absorption zone to recover the desorbed nitrogen oxides, nitric acid, etc. It is expected that high purity nitric acid will be produced in conduit 49 and will be attained by means of a relatively inexpensive regeneration procedure merely dropping the pressure and in many instances either using a portion of the compressed air already available in compressor 2 to help strip off adsorbed components at said reduced pressures or else installing a separate low pressure blower to supply air to help strip off adsorbed components.

The following example is presented to further illustrate the process of the present invention.

EXAMPLE 1

An adsorption column is constructed out of a 40 inch length, 2 inch diameter, 16 gauge stainless tubing.

The adsorption column is loaded with a little over 1000 grams of synthetic hydrogen form mordenite to produce a 34 inch length settled fixed bed. A feed gas is introduced into the bottom of the fixed bed during a first adsorption cycle at a rate of about 3.8 standard cubic feet per minute (s.c.f.m.) and passes upflow therethrough. The adsorbent bed is maintained at a pressure of about 85 p.s.i.g. and in inlet temperature of about 70° F. The composition of the feed gas is about 0.5 volume percent NO, 2.5 volume percent $O_2$ and 97 volume percent $N_2$ saturated with water. The effluent gas from the adsorbent bed is continuously analyzed for $NO_2$ by spectrophotometer and periodically grab samples of said effluent are taken and analyzed for $NO_x$ ($x$ is a number from about 1 to about 2) by the phenoldisulfonic acid method. The results show that for the first 45 minutes of charging feed gas the concentration of $NO_x$ and $NO_2$ in the effluent gas was less than 25 p.p.m. From the 45 minute mark to the 60 minute mark the concentration of $NO_2$ and $NO_x$ started to increase and at the 62 minute mark the concentration of $NO_x$ was about 300 p.p.m. (by phenoldisulfonic acid titration) and at the 65 minute mark the concentration of $NO_2$ was about 500 p.p.m. (by spectrophotometer).

The bed is thereafter regenerated by first depressuring the bed to atmospheric pressure (the effluent therefrom is bubbled through a water scrubber maintained at atmospheric pressure) and then passing air as outside stripping aid downflow through the bed at a rate of about 0.15 s.c.f.m. Nitric acid in high purity is recovered from the water scrubber. At the end of the same period of time as was used for the previously described first adsorption cycle, the bed is fully regenerated.

Another adsorption cycle at the same conditions as described hereinabove is performed for 50 minutes. At the end of the 50 minute period the feed gas flow rate is stopped and a second regeneration cycle is performed at the same conditions as above for 50 minutes. Similar results are obtained as in the first cycles. It is expected that the bed may be operated as described above indefinitely to remove $NO_x$ from the feed gas and recover nitric acid from the water scrubber.

I claim as my invention:

1. A combination process for the enhanced production of nitric acid which comprises:
    (a) introducing ammonia and air into a catalytic reaction zone at elevated pressure and temperature;
    (b) withdrawing a gaseous reactor effluent comprising nitrogen oxides from said reactor and introducing said gaseous reactor effluent into a lower part of a first absorption zone maintained at a pressure above about 50 p.s.i.g.;
    (c) introducing water into an upper part of the first absorption zone and absorbing and reacting nitrogen oxides therewith to form nitric acid therefrom;
    (d) withdrawing a gaseous stream containing a significant amount of unabsorbed nitrogen oxides from an portion of the first absorption zone;
    (e) contacting said gaseous stream with a mordenite adsorbent in a first adsorption bed at elevated pressures of from about 50 to about 120 p.s.i.g. to adsorb nitrogen oxides therefrom for a first period of time;
    (f) regenerating the adsorbent contained within said first adsorption bed for a second period of time by lowering the pressure in the first adsorbent bed to below about 10 p.s.i.g. and passing a gaseous stripping aid comprising air therethrough;
    (g) recovering a regeneration effluent gas from the first adsorption bed during the second period of time comprising stripping aid and components desorbed off the adsorbent;
    (h) introducing the regeneration effluent gas, without compression thereof, into a lower part of a second absorption zone maintained at about regeneration pressure;
    (i) introducing water into an upper part of the second absorption zone and absorbing and reacting nitrogen oxides therewith to form nitric acid therefrom; and
    (j) recovering nitric acid from the first and second adsorption zone.

2. The process of claim 1 further characterized in that the flowing volume of stripping aid passing through the adsorbent bed on the regeneration cycle exceeds the flowing volume of gaseous stream passing through adsorbent on the adsorption cycle.

3. The process of claim 2 further characterized in that the flowing volume of stripping aid on the regeneration cycle is from about 110% to about 200% of the flowing volume of gaseous stream on the adsorption cycle.

4. The process of claim 1 further characterized in that the stripping aid is derived from the same source as supplies the air to the catalytic reaction zone.

5. The process of claim 1 further characterized in that the stripping aid is derived from a separate low pressure blower.

6. In a process for the production of nitric acid wherein ammonia is oxidized to produce a hot gaseous stream comprising nitrogen oxides at elevated temperatures and pressures, the hot gaseous stream is contacted with water in a first absorption zone maintained at a pressure above about 50 p.s.i.g. to absorb a majority of the nitrogen oxides, the gaseous relatively cool high pressure effluent from the absorption zone containing significant amounts of nitrogen oxides is contacted with a mordenite adsorbent bed at a pressure of from about 50 to about 120 p.s.i.g. to adsorb a majority of the nitrogen oxides therefrom and the adsorbed components are recovered by regeneration of the adsorbent, the improvement which comprises regenerating the adsorbent by decreasing the pressure on the bed to below about 10 p.s.i.g. and desorbing the adsorbed gaseous components thereof, passing said desorbed components without compression thereof into a separate second low pressure absorption zone and contacting said components with water to absorb a majority thereof.

7. The process of claim 6 further characterized in that the pressure differential between when the bed is adsorbing nitrogen oxides and when the bed is being regenerated is at least 50 p.s.i.

References Cited

UNITED STATES PATENTS

| 1,391,332 | 1921 | McKee | 23—159 |
| 1,498,030 | 1924 | Halvorsen | 23—161 |
| 2,853,365 | 1958 | Barrer et al. | 23—159 |
| 2,918,140 | 12/1959 | Brooks | 55—75 |

FOREIGN PATENTS 458,877  8/1949  Canada.

OTHER REFERENCES

R. Barrer, "British Chemical Engineering," May 1959, page 278.

Chemical Abstracts, vol. 52, July 1958, page 13,204.

Chemical Absracts, vol. 65, November 1966, page 16,092.

OSCAR R. VERTIZ, Primary Examiner

G. O. PETERS, Assistant Examiner